United States Patent
Chen et al.

(10) Patent No.: US 10,107,903 B2
(45) Date of Patent: Oct. 23, 2018

(54) HUMAN BODY SECURITY INSPECTION APPARATUS

(71) Applicants: Nuctech Company Limited, Beijing (CN); Tsinghua University, Beijing (CN)

(72) Inventors: Zhiqiang Chen, Beijing (CN); Ziran Zhao, Beijing (CN); Wanlong Wu, Beijing (CN); Lin Yang, Beijing (CN); Yingkang Jin, Beijing (CN); Ming Ruan, Beijing (CN); Chengcong Xu, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 293 days.

(21) Appl. No.: 14/958,245

(22) Filed: Dec. 3, 2015

(65) Prior Publication Data
US 2016/0187529 A1    Jun. 30, 2016

(30) Foreign Application Priority Data

Dec. 5, 2014    (CN) .......................... 2014 1 0738076

(51) Int. Cl.
*G01S 13/88*    (2006.01)
*G01V 8/00*    (2006.01)
(Continued)

(52) U.S. Cl.
CPC ............ *G01S 13/887* (2013.01); *G01S 13/89* (2013.01); *G01V 3/12* (2013.01); *G01V 8/005* (2013.01)

(58) Field of Classification Search
CPC ........ G01V 8/005; G01V 3/12; G01S 13/887; G01S 13/89
See application file for complete search history.

(56) References Cited

U.S. PATENT DOCUMENTS 6,970,086 B2 *  11/2005  Nelson .................... G01V 3/104
                                                324/243
6,970,087 B2 *  11/2005  Stis ........................ G01V 3/105
                                                324/228
(Continued)

FOREIGN PATENT DOCUMENTS

CN         2695962 Y      4/2005
CN         1864079 A     11/2006
(Continued)

OTHER PUBLICATIONS

Alpha Wire. "Understanding Shielded Cable" 2009. 5 pages. Accesseed online Feb. 9, 2018. <https://www.mouser.com/pdfdocs/alphawire-Understanding-Shielded-Cable.pdf>.*
(Continued)

*Primary Examiner* — Matthew M Barker
(74) *Attorney, Agent, or Firm* — Westman, Champlin & Koehler, P.A.

(57) ABSTRACT

The present disclosure provides a human body security inspection apparatus, comprising: a base on which an inspected human stands; a millimeter-wave transceiver configured to perform a millimeter-wave scanning operation on the body of the inspected human standing on the base so as to detect whether or not the inspected human carries contraband and output a first signal; and a metal sensing detector arranged within the base and configured to detect whether or not there is a metallic foreign object in underside of a shoe of the inspected human and output a second signal.

8 Claims, 2 Drawing Sheets

(51) Int. Cl.
*G01S 13/89* (2006.01)
*G01V 3/12* (2006.01)

(56) References Cited

U.S. PATENT DOCUMENTS

| | | | | |
|---|---|---|---|---|
| 7,595,638 | B2* | 9/2009 | Crowley | G01V 3/101 324/300 |
| 8,513,615 | B2 | 8/2013 | Chen et al. | |
| 8,654,922 | B2* | 2/2014 | Bendahan | G01V 3/104 378/63 |
| 9,223,051 | B2* | 12/2015 | Bendahan | G01V 3/104 |
| 2004/0222790 | A1* | 11/2004 | Karmi | G01R 33/441 324/300 |
| 2007/0211922 | A1* | 9/2007 | Crowley | B64F 1/366 382/115 |
| 2010/0214150 | A1 | 8/2010 | Lovberg et al. | |
| 2011/0102597 | A1* | 5/2011 | Daly | G01S 13/887 348/162 |
| 2012/0069963 | A1* | 3/2012 | Song | G01V 5/0025 378/87 |
| 2012/0085909 | A1 | 4/2012 | Chen et al. | |
| 2012/0307967 | A1* | 12/2012 | Smith | G01V 5/0016 378/57 |
| 2014/0185755 | A1* | 7/2014 | Bendahan | G01V 3/104 378/57 |

FOREIGN PATENT DOCUMENTS

| | | |
|---|---|---|
| CN | 201222058 Y | 4/2009 |
| CN | 201749103 U | 2/2011 |
| CN | 102135629 A | 7/2011 |
| CN | 102313907 A | 1/2012 |
| CN | 102914802 A | 2/2013 |
| CN | 104076358 A | 10/2014 |
| CN | 204228982 U | 3/2015 |
| WO | 2011128418 A1 | 10/2011 |

OTHER PUBLICATIONS

First Office Action, including Search Report, for Chinese Patent Application No. 201410738076.4, dated Jul. 5, 2016, 8 pages.
Second Office Action, including Search Report, for Chinese Patent Application No. 201410738076.4, dated Oct. 25, 2016, 9 pages.
Journal Article, Chinese Master's Theses Full-text Database-Information Science and Technology, dated May 15, 2011, 5 pages.

* cited by examiner

HUMAN BODY SECURITY INSPECTION APPARATUS

CROSS-REFERENCE TO RELATED APPLICATION

This application claims the benefit of the Chinese Patent Application No. 201410738076.4 filed on Dec. 5, 2014 in the State Intellectual Property Office of China, the whole disclosure of which is incorporated herein by reference.

BACKGROUND OF THE INVENTION

Technical Field

Embodiments of the present invention generally relate to the field of human body security inspection, and particularly, to a human body security inspection apparatus involving a millimeter-wave holographic imaging technology.

Description of the Related Art

Active millimeter-wave holographic imaging technology is the one of most widely used imaging type human body security inspection technologies. An apparatus or system for human body security inspection involving the millimeter-wave holographic imaging technology mainly utilizes two scanning modes: one is a cylinder scanning mode, in which a millimeter-wave transceiver array is vertically arranged, and is configured to horizontally rotate during scanning; the other is a plane scanning mode, in which the millimeter-wave transceiver array is horizontally arranged and is configured to translate in a vertical direction during scanning. Currently, human body security inspection products utilizing the two scanning modes have a common blind area during scanning persons, that is, information about an underside of a foot or shoe of an inspected human cannot be obtained.

SUMMARY OF THE INVENTION

The present invention has been made to overcome or alleviate at least one of the above and other problems and disadvantages in prior arts.

An object of the present invention is to provide a human body security inspection apparatus, which is capable of eliminating the scanning blind area of the millimeter-wave human scanning apparatus so as to perfect its security inspection function.

According to one aspect of the present disclosure, there is provided a human body security inspection apparatus, comprising:

a base on which an inspected human stands;

a millimeter-wave transceiver configured to perform a millimeter-wave scanning operation on the body of the inspected human standing on the base so as to detect whether or not the inspected human carries contraband and output a first signal; and a metal sensing detector arranged within the base and configured to detect whether or not there is a metallic foreign object in an underside of a shoe of the inspected human and output a second signal.

In the above human body security inspection apparatus, the metal sensing detector may comprise a high frequency oscillator configured to detect the metallic foreign object in the underside of the shoe of the inspected human by sensing a change in an electromagnetic field.

In the above human body security inspection apparatus, the base may comprise a top plate on which a standing area is provided to indicate the inspected human to stand, and the high-frequency oscillator may comprise a coil configured to build a high frequency electromagnetic field around the standing area, and a detection circuit configured to detect a change in the electromagnetic field due to the metallic foreign object in the underside of the shoe of the inspected human.

In the above human body security inspection apparatus, the high-frequency oscillator may be positioned below the standing area, and at least a portion of the top plate of the base within the standing area is made of a non-metallic material.

The above human body security inspection apparatus may further comprise a control device configured to communicate with the millimeter-wave transceiver and the metal sensing detector so as to control them to perform security inspection operations on the inspected human.

In the above human body security inspection apparatus, the control device may be further configured to control the millimeter-wave transceiver and the metal sensing detector to perform the corresponding security inspection operations in different time periods.

The above human body security inspection apparatus may further comprise: a data processing device configured to communicate with the millimeter-wave transceiver and the metal sensing detector, to receive and process the first signal so as to reconstruct a millimeter-wave hologram image of the body of the inspected human, and receive and process the second signal to obtain metal sensing information about the sensed metal in the underside of the shoe of the inspected human; and a display device configured to receive and display the millimeter-wave hologram image and the metal sensing information.

In the above human body security inspection apparatus, the control device may be further configured to control the metal sensing detector to be always in a working state when the inspected human is inspected by the human body security inspection apparatus, and to control the millimeter-wave transceiver to scan the inspected human only when the inspected human stands on the base, and the data processing device may be further configured to process a signal obtained during a time period where the millimeter-wave transceiver does not scan so as to obtain the metal sensing information.

The above human body security inspection apparatus may further comprise a shielding treatment device configured to supply power to both the millimeter-wave transceiver and the metal sensing detector from a power supply system, and to isolate and shield the millimeter-wave transceiver from being interfered by the metal sensing detector.

The above human body security inspection apparatus may further comprise another millimeter-wave transceiver arranged opposite to the millimeter-wave transceiver, and the two millimeter-wave transceivers are configured to perform a linked scan so as to obtain a holographic imaging of the inspected human.

Other purposes and advantages of the present disclosure will become apparent and a full understanding of the present disclosure will be facilitated through the following detail description of the present disclosure with reference to the accompanying drawings.

BRIEF DESCRIPTION OF THE DRAWINGS

Features and advantages of the present disclosure will be more clearly understood with reference to the accompanying drawings, which are exemplary and should not be interpreted as being limitative to the present disclosure and in which.

DETAILED DESCRIPTION OF PREFERRED EMBODIMENTS OF THE INVENTION

Figure 1:
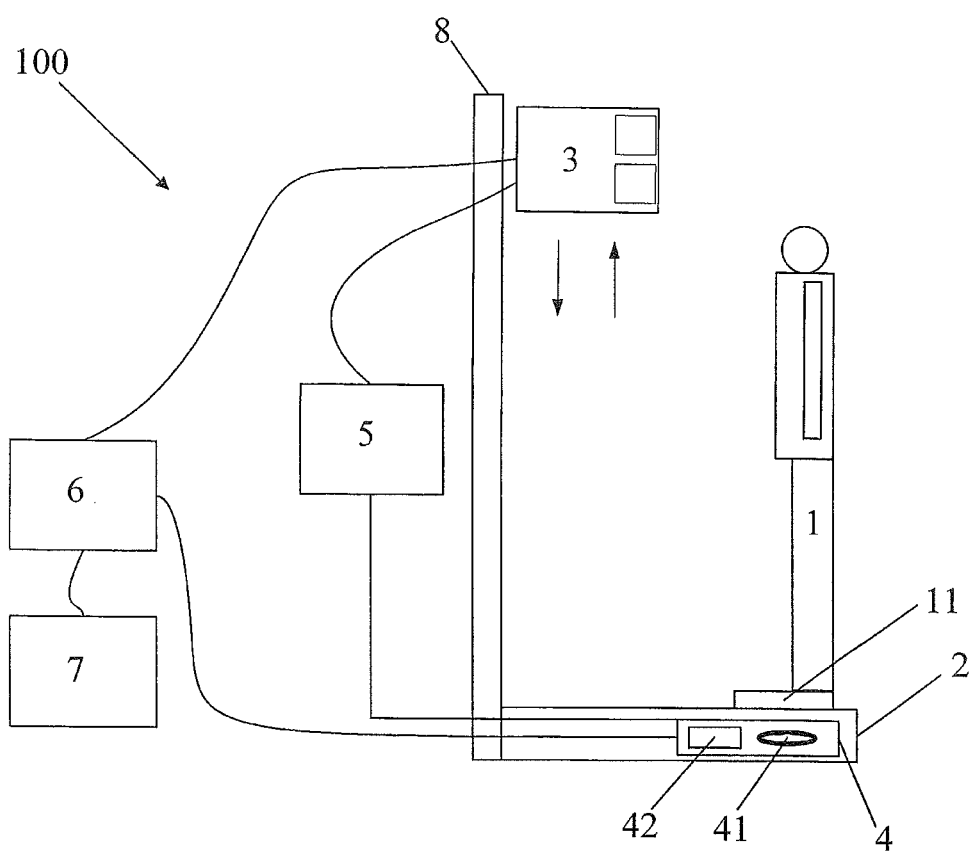
FIG. 1 is a block diagram schematically showing a configuration of a human body security inspection apparatus according to one exemplary embodiment of the present disclosure.

Technique solutions in embodiments of the present disclosure will be described clearly and completely hereinafter with reference to the drawings in the embodiments of the present disclosure. It will be obvious that the descried embodiments are only parts of the embodiments of the present disclosure, but are not directed to all embodiments. Any other embodiment, which is obtained based on the descried embodiments by the person skilled in the art without inventive work, falls within the protection scopes of the present invention.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general inventive concept of the present disclosure, there is provided a human body security inspection apparatus, comprising a millimeter-wave transceiver configured to perform a millimeter-wave scanning operation on the body of an inspected human so as to detect whether or not the inspected human carries contraband, and a metal sensing detector configured to detect whether or not there is a metallic foreign object in an underside of a shoe of the inspected human.

Thereby, the scanning blind area present in the prior art millimeter-wave human scanning apparatus can be remedied or eliminated by incorporating the metal sensing detector for detecting metallic objects in the underside of the shoe of the inspected human into the millimeter-wave human scanning apparatus.

FIG. 1 schematically shows a configuration of a human body security inspection apparatus 100 according to one exemplary embodiment of the present disclosure. It will be understood that the human body security inspection apparatus 100 can be arranged in various public occasions for inspecting whether or not a human 1 carries contraband.

In the embodiment shown in FIG. 1, the human body security inspection apparatus 100 comprises a base or foot pad 2 on which the inspected human 1 stands, a millimeter-wave transceiver 3 configured to perform a millimeter-wave scanning operation on the body of the inspected human 1 standing on the base 2, and a metal sensing detector 4 arranged within the base 2 and configured to detect whether or not there is a metallic foreign object in an underside of a foot or shoe 11 of the inspected human 1.

In the present disclosure, the scanning mode for the millimeter-wave transceiver is not limited, for example, a cylinder scanning mode or a plane scanning mode may be used. In one example, the millimeter-wave transceiver 3 may be slid or moved up and down (as shown by arrow) along a guide rail 8 mounted on a frame (not shown) of the human body security inspection apparatus 100, while emitting millimeter-wave to the inspected human 1 standing on the base 2 and receiving reflected millimeter-wave signals. A data processing device 6 of the human body security inspection apparatus 100 is configured to receive signals from the millimeter-wave transceiver 3 and reconstruct a millimeter-wave hologram image of the inspected human 1.

The base 2 on which the inspected human 1 stands has a top plate, which is provided thereon with a standing area or footprint (not shown) to indicate the inspected human 1 to stand. The metal sensing detector 4 is provided within the base 2 below the standing area so as to detect whether or not there is a metallic foreign object in the underside of the foot or shoe 11 of the inspected human 1.

In one example, the metal sensing detector 4 may be or comprise a high-frequency oscillator configured to detect the metallic foreign object in the underside of the shoe of the inspected human 1 by sensing a change in an electromagnetic field. As shown in FIG. 1, the high-frequency oscillator 4 may comprise a coil 41 configured to build a high frequency electromagnetic field around the standing area, and a detection circuit 42 configured to detect a change in the electromagnetic field due to the metallic foreign object in the underside of the shoe of the inspected human 1. The high frequency electromagnetic field can be concentrated adjacent to the underside of the shoe of the inspected human 1 as more as possible by designing the shape and arrangement of the coil 41, controlling a current or voltage applied to the coil 41, and the like, and the sensitivity of high frequency oscillator may be adjusted by changing design or internal configuration of the detection circuit 42.

Upon feeding power to the high frequency oscillator 4 to operate, the coil 41 will build a stable high frequency electromagnetic field within a certain range above the base 2; when metallic contraband is hidden in the underside of the shoe of the inspected human 1, a change in the electromagnetic field will be caused due to movement of the inspected human 1 on the base 2, including change in oscillation frequency and/or amplitude. This change will be detected by the detection circuit 42 of the high frequency oscillator, and the detection circuit 42 may output a signal indicative of this change to the data processing device 6, or may output a metal-detected alarm signal by comparing the changes in oscillation frequency and amplitude. Features, such as type, size and the like, of the metallic object will produce different influences on the frequency and amplitude of the electromagnetic field built by the high frequency oscillator 4, and a dangerous level of the metallic object in the underside of the shoe of the inspected human 1 can be determined by comparing the detected signal to a pre-detected signal of a metal sample. In one example, the metallic foreign object in the shoes can be also determined through a difference between signals about undersides of right and left shoes of the inspected human 1 detected by the high frequency oscillator 4.

In the present disclosure, the high frequency oscillator 4 is arranged within the foot pad or base 2, and thus preferably, the base 2, especially the top plate of the base 2, is made of a non-metallic material, such as wood, plastic or the like, or at least a portion of the top plate within the standing area is made of a non-metallic material, thereby reducing adverse effects on the high frequency electromagnetic field generated by the coil 41.

As shown in FIG. 1, the human body security inspection apparatus 100 may further comprise a control device 5 and a data processing device 6. The control device 5 is configured to communicate with the millimeter-wave transceiver 3 and the metal sensing detector 4 so as to control them to perform security inspection operations on the inspected human 1. For example, the control device 5 may transmit a signal to a drive device (not shown) of the millimeter-wave transceiver 3 so as to drive the millimeter-wave transceiver 3 to scan the body of the inspected human 1. The data processing device 6 is configured to communicate with the millimeter-wave transceiver 3 and the metal sensing detector 4, to receive and process the signals from the millimeter-wave transceiver 3 so as to reconstruct a millimeter-wave hologram image of the body of the inspected human 1, and to receive and process the signals from the metal sensing detector 4 to obtain metal sensing information about detected metal the underside of the shoe of the inspected human. The human body security inspection apparatus 100 may further comprise a display device 7 configured to receive signals and display the millimeter-wave hologram image and the metal sensing information.

Although in the example shown in the figures, the millimeter-wave transceiver 3, the metal sensing detector 4, the control device 5, the data processing device 6 and the like are in wired communication among one another, obviously, they may transmit signals through wireless communication, and the present disclosure is not limited to this. In addition, the control device 5 and the data processing device 6 may be in form of microcontroller, microprocessor or the like, or may be integrated in a monitoring computer.

In one example, the control device 5 is further configured to control the millimeter-wave transceiver 3 and the metal sensing detector 4 to perform the respective security inspection operations on the inspected human 1 within different time periods. For example, the metal sensing detector 4 is configured to operate during a time period in which the apparatus 100 does not perform the millimeter-wave scan operation, for example, during a time period in which the inspected human is going toward the base 2 or is just standing on the base 2, or during a time period in which the inspected human is turning his/her back and going away from the base 2, during which the millimeter-wave transceiver 3 does not scan the body. By this way, the metal sensing detector 4 operates during this time period for detecting whether or not there is a metallic object in the foot or shoe 11 of the inspected human 1, and thus is prevented from being affected by various metal materials in the millimeter-wave transceiver 3 and their movement around the coil, for example, adverse influence on frequency and amplitude of the high frequency electromagnetic field built by the high frequency oscillator can be avoided, thereby avoiding metal misinformation.

Alternatively, the control device 5 may be configured to control the metal sensing detector 4 to be always in a working state, for example, when the inspected human 1 is being inspected by the human body security inspection apparatus 100, and to control the millimeter-wave transceiver 3 to scan the inspected human 1 only when the inspected human 1 is standing on the base; meanwhile, the data processing device 6 is configured to process signals obtained during a time period where the millimeter-wave transceiver 3 does not scan so as to obtain the metal sensing information, thereby eliminating an error alarm, which may be caused by the millimeter-wave transceiver 3, in terms of time sequence. It will be understood the data processing device 6 may be further configured to filter out background noise, so that the metal sensing detector 4 is prevented from being adversely affected by metallic objects in the surrounding environment and their movements.

In one example of the human body security inspection apparatus 100, both the millimeter-wave transceiver 3 and the metal sensing detector 4 may be powered by the same one power supply system (not shown), which even supplies power to other devices in the apparatus 100, such as the control device 5, the data processing device 6, the display device 7, the drive device and the like. In such a case, a shielding treatment device is provided for the power supply for the human body security inspection apparatus 100, for isolating and shielding precision instruments, such as, the metal sensing detector, of the millimeter-wave transceiver from being interfered by the power supply. For example, anti-interference measures may be provided on cables, for example, power supply filter, cable shield or the like, for processing, such as shielding, filtering or the like, circuits, power supply and signals of the metal sensing detector or the high frequency oscillator 4.

Only one millimeter-wave transceiver 3 is provided in the embodiment shown in FIG. 1. In the embodiment, the millimeter-wave transceiver 3 may perform a vertical scanning operation in combination with a circumferential scanning operation around the inspected human 1; or, the millimeter-wave transceiver 3 may only perform a vertical scanning operation so as to scan the back side of the inspected human 1 after the front side of the inspected human 1 is scanned and the inspected human 1 turns his/her back. During turning-back movement of the inspected human 1, the high-frequency oscillator 4 may also operate so as to detect whether or not turning-back movement of the inspected human 1 will result in a change in electromagnetic field, thereby identifying the metallic foreign object.

Figure 2:
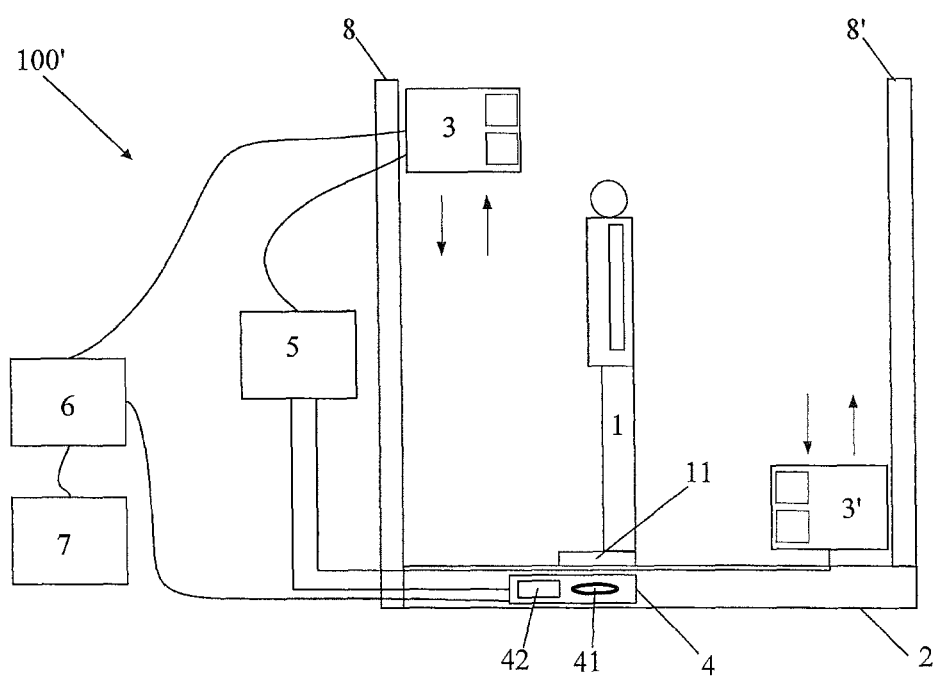
FIG. 2 is a block diagram schematically showing a configuration of a human body security inspection apparatus according to another exemplary embodiment of the present disclosure.

FIG. 2 shows an embodiment of an alternative human body security inspection apparatus 100'. The embodiment shown in FIG. 2 is different from FIG. 1 in that there is provided two millimeter-wave transceivers 3, 3', which are arranged to face each other and may move or slide along respective guide rails 8, 8' in opposite directions so as to scan the inspected human 1 in a linked way and obtain a holographic imaging of the inspected human.

As described above, in the human body security inspection apparatus according to the embodiments of the present disclosure, the metal sensing detector for detecting metallic objects in the undersides of the feet or shoes of inspected human is incorporated in the millimeter-wave human scanning apparatus, so that the scanning blind area occurring in the prior art millimeter-wave human scanning apparatus can be remedied or eliminated, thereby enabling a full human body security inspection and improving security.

Although several exemplary embodiments of the present disclosure have been shown and described, it would be appreciated by those skilled in the art that various changes or modifications may be made in these embodiments without departing from the principles and spirit of the present invention, the scope of which is defined in the claims and their equivalents.

What is claimed is:

1. A human body security inspection apparatus, comprising:
   a base on which an inspected human stands;
   a millimeter-wave transceiver configured to perform a millimeter-wave scanning operation on the body of the inspected human standing on the base so as to detect whether or not the inspected human carries contraband and output a first signal;
   a metal sensing detector arranged within the base and configured to detect whether or not there is a metallic foreign object in an underside of a shoe of the inspected human and output a second signal;

a control device configured to communicate with the millimeter-wave transceiver and the metal sensing detector so as to control the metal sensing detector to be always in a working state when the inspected human is being inspected by the human body security inspection apparatus, and to control the millimeter-wave transceiver to scan the inspected human only when the inspected human is standing on the base; and a data processing device configured to process the second signal only when obtained during a time period where the millimeter-wave transceiver does not scan the inspected human so as to obtain metal sensing information about a sensed metal in the underside of the shoe of the inspected human.

2. The human body security inspection apparatus according to claim 1, wherein the metal sensing detector comprises a high frequency oscillator configured to detect the metallic foreign object in the underside of the shoe of the inspected human by sensing a change in an electromagnetic field.

3. The human body security inspection apparatus according to claim 2, wherein the base comprises a top plate on which a standing area is provided to indicate the inspected human to stand, and
the high-frequency oscillator comprises:
a coil configured to build a high frequency electromagnetic field around the standing area; and
a detection circuit configured to detect a change in the electromagnetic field due to the metallic foreign object in the underside of the shoe of the inspected human.

4. The human body security inspection apparatus according to claim 3, wherein the high-frequency oscillator is positioned below the standing area, and at least a portion of the top plate of the base within the standing area is made of a non-metallic material.

5. The human body security inspection apparatus according to claim 2, further comprising a shielding treatment device configured to supply power to both the millimeter-wave transceiver and the metal sensing detector from a power supply system, and to isolate and shield the millimeter-wave transceiver from being interfered by the metal sensing detector.

6. The human body security inspection apparatus according to claim 1, wherein:
data processing device is further configured to communicate with the millimeter-wave transceiver and the metal sensing detector, to receive and process the first signal so as to reconstruct a millimeter-wave hologram image of the body of the inspected human; and
the human body security inspection apparatus further comprises a display device configured to receive and display the millimeter-wave hologram image and the metal sensing information.

7. The human body security inspection apparatus according to claim 1, further comprising a shielding treatment device configured to supply power to both the millimeter-wave transceiver and the metal sensing detector from a power supply system, and to isolate and shield the millimeter-wave transceiver from being interfered by the metal sensing detector.

8. The human body security inspection apparatus according to claim 1, further comprising an another millimeter-wave transceiver arranged opposite to the millimeter-wave transceiver, and the two millimeter-wave transceivers are configured to perform a linked scan so as to obtain a holographic imaging of the inspected human.

* * * * *